(12) United States Patent
Thépaut et al.

(10) Patent No.: US 9,990,416 B2
(45) Date of Patent: Jun. 5, 2018

(54) ANALYSIS GROUPS FOR SEMANTIC LAYER

(75) Inventors: Serge Thépaut, Ermont (FR); Juan Francisco Calvente, Paris (FR)

(73) Assignee: BUSINESS OBJECTS SOFTWARE LIMITED, Dublin (IE)

( * ) Notice: Subject to any disclaimer, the term of this patent is extended or adjusted under 35 U.S.C. 154(b) by 876 days.

(21) Appl. No.: 12/629,580

(22) Filed: Dec. 2, 2009

(65) Prior Publication Data

US 2011/0131248 A1    Jun. 2, 2011

(51) Int. Cl.
G06F 17/30    (2006.01)
G06F 17/00    (2006.01)

(52) U.S. Cl.
CPC .............................. G06F 17/30607 (2013.01)

(58) Field of Classification Search
CPC ...................... G06F 17/30592; G06F 17/30607
USPC .................................................. 707/769, 802
See application file for complete search history.

(56) References Cited

U.S. PATENT DOCUMENTS

| | | | |
|---|---|---|---|
| 5,426,747 A | 6/1995 | Weinreb et al. | |
| 5,555,403 A | 9/1996 | Cambot et al. | |
| 5,627,979 A | 5/1997 | Chang et al. | |
| 5,734,887 A | 3/1998 | Kingberg et al. | |
| 5,765,159 A | 6/1998 | Srinivasan | |
| 5,937,402 A | 8/1999 | Pandit | |
| 6,101,502 A | 8/2000 | Heubner et al. | |
| 6,205,447 B1 | 3/2001 | Malloy | |
| 6,684,207 B1 | 1/2004 | Greenfield et al. | |
| 6,928,431 B2 | 8/2005 | Dettinger et al. | |
| 7,313,561 B2 | 12/2007 | Lo et al. | |
| 7,546,226 B1 | 6/2009 | Yeh et al. | |
| 7,606,829 B2 | 10/2009 | Dettinger et al. | |
| 7,904,415 B2 | 3/2011 | Khatchatrian et al. | |
| 2002/0023091 A1* | 2/2002 | Silberberg et al. | 707/103 Y |
| 2002/0059195 A1* | 5/2002 | Cras et al. | 707/3 |
| 2002/0091681 A1* | 7/2002 | Cras et al. | 707/3 |
| 2004/0139061 A1* | 7/2004 | Colossi et al. | 707/3 |
| 2005/0010579 A1* | 1/2005 | Shoup | G06F 17/30312 |

(Continued)

OTHER PUBLICATIONS

Jean-Yves Cras et al., U.S. Appl. No. 12/463,702, entitled "Functionally-Dependent Analysis Objects", filed May 11, 2009.

(Continued)

Primary Examiner — Taelor Kim
(74) Attorney, Agent, or Firm — Buckley, Maschoff & Talwalkar LLC (57) ABSTRACT

A system may include a database of physical data tables including stored data, and an abstraction layer associated with the stored data. The abstraction layer may include a measure object associated with a measure, a plurality of dimension objects associated with respective dimensions, a first analysis group object linked to the measure object, to a first one or more of the plurality of dimension objects, and to a first portion of the stored data associating the measure with respective dimensions of the first one or more of the plurality of dimension objects, and a second analysis group object linked to the measure object, to a second one or more of the plurality of dimension objects, and to a second portion of the stored data associating the measure with respective dimensions of the first one or more of the plurality of dimension objects and of the second one or more of the plurality of dimension objects.

20 Claims, 11 Drawing Sheets

(56) References Cited

U.S. PATENT DOCUMENTS

| | | | |
|---|---|---|---|
| 2007/0130116 A1* | 6/2007 | Cras | G06F 17/30398 |
| 2008/0059449 A1* | 3/2008 | Webster et al. | 707/5 |
| 2008/0082493 A1* | 4/2008 | Polo-Malouvier | G06F 17/30592 |
| 2008/0195608 A1* | 8/2008 | Clover | 707/5 |
| 2009/0019022 A1 | 1/2009 | Schallert et al. | |
| 2009/0228436 A1* | 9/2009 | Pasumansky et al. | 707/3 |
| 2010/0174754 A1* | 7/2010 | B'Far | G06F 17/30507 707/794 |
| 2010/0287223 A1 | 11/2010 | Cras et al. | |

OTHER PUBLICATIONS

"Non-Final Office Action" dated Jun. 22, 2011, for U.S. Appl. No. 12/463,702, entitled "Functionally Dependent Analysis Objects", filed May 11, 2009, 16pgs.

"Final Office Action" dated Feb. 28, 2012, for U.S. Appl. No. 12/463,702, entitled "Functionally-Dependent Analysis Objects", filed May 11, 2009, 18pgs.

Sarajit Chaudhuri et al., "An Overview of Data Warehousing and OLAP Technology", ACM SIGMOD Record, vol. 26, Issue 1, Mar. 1997, (pp. 65-74, 10 pages total).

Camille Furtado et al., "Physical and Virtual Partitioning in OLAP Database Clusters", Proceedings of the 17th International Symposium on Computer Architecture and High Performance Computing (SBAC-PAD 2005), Oct. 24-27, 2005, IEEE, (pp. 143-150, 8 pages total).

A. Sotnykova et al., "Semantic Mappings in Description Logics for Spatio-temporal Database Schema Integration", Journal on Data Semantics III, LNCS 3534, Springer-Verlag, Berlin, Germany, Copyright 2005, (pp. 143-167, 25 pages total).

Robert Wrembel et al., "Metadata Management in a Multiversion Data Warehouse", CoopIS/DOA/ODBASE 2005, INCS 3761, Springer-Verlag, Berlin, Heidelberg, Germany, Copyright 2005, (pp. 1347-1364, 18 pages total).

Mario Döller et al., "The MPEG-7 Multimedia Database System (MPEG-7 MMDB)", The Journal of Systems and Software, vol. 81, Copyright 2008 (pp. 1559-1580, 22 pages total).

Albert Abelló et al., "Benefits of an Object-Oriented Multidimensional Data Model", Objects and Databases 2000, LNCS 1944, Springer-Verlag, Berlin Heidelberg, Germany, Copyright 2001, (pp. 141-152, 12 pages total).

Thanh N. Huynh et al., "Metadata for Object-Relational Data Warehouse", DMDW '2000, Stockholm, Sweden, Jun. 5-6, 2000, (pp. 3-1 to 3-9, 9 pages total0.

Elisa Bertino et al., "Object-Oriented Database Management Systems: Concepts and Issues", Computer, IEEE Computer Society, vol. 24, Issue 4, Apr. 1991, (pp. 33-47, 15 pages total).

Arthur M. Keller et al., "Persistence Software: Bridging Object-Oriented Programming and Relational Databases", SIGMOD, Washington, DC, Copyright 1993, ACM 0-87791-592-5/93/0005/0523 . . . , (pp. 523-528, 6 pages total).

Microsoft Computer Dictionary, 5th Edition, Microsoft Press, Redmond, WA, Copyright 2002, (cover 2pgs + p. 141 + p. 276 + p. 300 + p. 510, (6 pages total).

Torben Bach Pedersen et al., "Multidimensional Database Technology", Computer, IEEE Computer Society, vol. 34, Issue 12, Dec. 2001 (pp. 40-46, 7 pages total).

\* cited by examiner

| Month (204) | Company (206) | Activity (208) | Product (209) | Sales (202) |
|---|---|---|---|---|
| 01/08 | Acco | Metal | Steel | 2000 |
| 01/08 | Acco | <null> | <null> | 10000 |
| 01/08 | Acco | Metal | Zinc | 1020 |
| 01/08 | Acco | Metal | <null> | 5000 |
| 01/08 | Totl | <null> | <null> | 20000 |
| 01/08 | Totl | Metal | <null> | 9900 |
| 01/08 | Acco | Metal | Copper | 2000 |
| 01/08 | Gbm | <null> | <null> | 8000 |
| 01/08 | Acco | Service | <null> | 4490 |
| ... | ... | ... | ... | ... |

|  |  | Month = 01/08/2008 |  | Analysis = Corporate |  |  |
|---|---|---|---|---|---|---|
|  | Company | ... | ... | Acco | Totl | ... |
| Measures |  | ⟵905 |  |  |  |  |
| Head Count | Most selected measures can be drilled through :<br>- Activity (click here) |  | ... | 120 | 80 |  |
| Sales |  |  | ... | 10000 | 4785 |  |
| Cost | Can drill through to :<br>- Activity (click here)<br>- Product (click here) | 910 | ... | ... | ... |  |
| ... |  |  | ... | ... | ... |  |
|  | Can drill through to :<br>- Activity (click here) |  |  |  |  |  |
|  | ⟵915 |  |  |  |  |  |

| | | Month = 01/08/2008 | | Activity = All | | |
|---|---|---|---|---|---|---|
| | Company | ... | Acco | Acco | Totl | Totl |
| | Analysis | ... | Corporate | By Activity | Corporate | By Activity |
| Measures | | | | | | |
| Head Count | | ... | 120 | 120 | 80 | 80 |
| Sales | | ... | 10000 (1110) | 9900 (1120) | 4785 | ... |
| Cost | | ... | 2000 | ... | ... | ... |
| ... | | ... | ... | ... | ... | ... |
| | | | | | | |
| | | | | | | |
| | | | | | | |

| | | Month = 01/08/2008 | | Analysis = Corporate | | |
|---|---|---|---|---|---|---|
| | Company | ... | Acco | Totl | ... | ... |
| Measures | | | | | | |
| Head Count | | ... | ... | 120 | 80 | ... |
| Corporate Sales | | ... | ... | 10000 | 4785 | ... |
| Corporate Cost | | ... | ... | 2000 | ... | ... |
| Sales by Activity | | ... | ... | 9900 | ... | ... |
| Cost by Activity | | ... | ... | ... | ... | ... |
| Sales by Activity And product | | ... | ... | ... | ... | ... |
| | | | | | | |
| | | | | | | |
| | | | | | | |

*FIG. 12*

ANALYSIS GROUPS FOR SEMANTIC LAYER

BACKGROUND

Business data is typically stored within physical tables of a database. The database may comprise a relational database such as SAP MaxDB, Oracle, Microsoft SQL Server, IBM DB2, Teradata and the like. Alternatively, the database could be a multi-dimensional database, an eXtendable Markup Language document, or any other structured data storage system. The physical tables may be distributed among several relational, dimensional, and/or other data sources.

The structures of and relationships between the physical database tables are complex. A typical end user is therefore unable to locate or extract desired information from the physical database tables. Business Intelligence (BI) tools (e.g., BusinessObjects Information Designer®) may therefore be used to build an abstraction layer that shields end users from the complexity of the physical tables. More specifically, the abstraction layer allows the end users to query a database using intuitive terms rather than references to specific physical entities of the database.

Commonly-assigned and co-pending U.S. patent application Ser. No. 12/463,702 describes such an abstraction layer, referred to therein as a semantic layer. Briefly, the "business objects" of an abstraction layer represent business entities, such as customers, products, stores, time, sales figures, etc., represented in the data of a data source. Business objects may be classified as dimension objects (i.e., to represent dimensions along which one may want to perform an analysis or report), detail objects (e.g., to represent additional information on dimensions), and measure objects (e.g., to represent indicators, most often numeric, whose value can be determined for a given combination of dimension values). In one example, a Sales measure object may be used to determine the total sales for January (i.e., a value of the Month dimension object) in France (i.e., a value of the Country dimension object).

Within a business, the same data (e.g., revenue) may be tracked by different departments at different levels of granularity. For example, at the corporate level, revenue may be recorded for each line of business, while each line of business may record revenue at the product level. Due to data entry errors, incomplete data, etc., the total revenue recorded by a particular line of business (i.e., the aggregation of revenues associated with each product of the line of business) may not equal the revenue recorded for that line of business at the corporate level.

Figure 1:
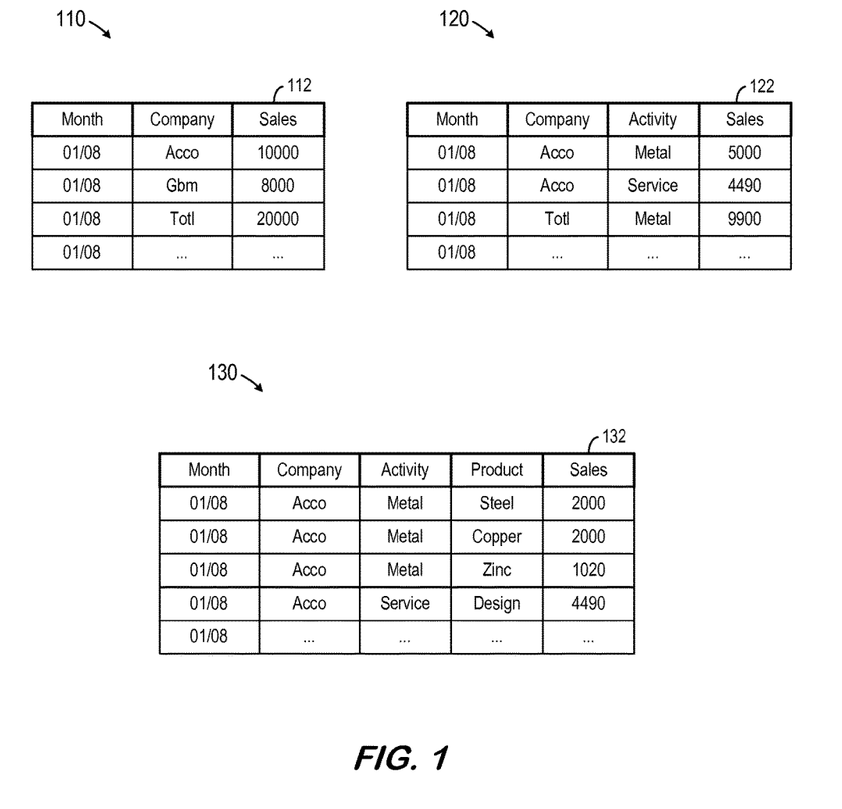
FIG. 1 illustrates portions of physical database tables.

FIG. 1 displays portions of physical database tables 110, 120 and 130 which illustrate the foregoing scenario. Tables 110, 120 and 130 may be contained in a data warehouse associated with a particular business. According to the present example, table 110 may be considered sales data compiled at the corporate level. Each row of table 110 associates a month and a company with sales figures for that company during that month.

Table 120 includes sales data compiled at the activity level. Each row of table 120 associates a month, a company and an activity with sales figures for that month, company and activity. Lastly, it may be assumed that table 130 includes sales data compiled by a particular company at the product level. The data of tables 110, 120 and 130 may appear partially redundant, however, since these tables are fed independently, several inconsistencies are exposed therein.

For example, table 110 shows total sales of 10000 for the company "Acco" in January 2008 (i.e., 01/08). In contrast, table 120 shows total sales of 9490 (i.e., 5000+4490) for the same company and period. Moreover, table 120 shows sales of 5000 during January 2008 for Acco and the activity "metal", while table 130 shows sales of 5020 (i.e., 2000+2000+1020) for the same period, company and activity.

Figure 2:
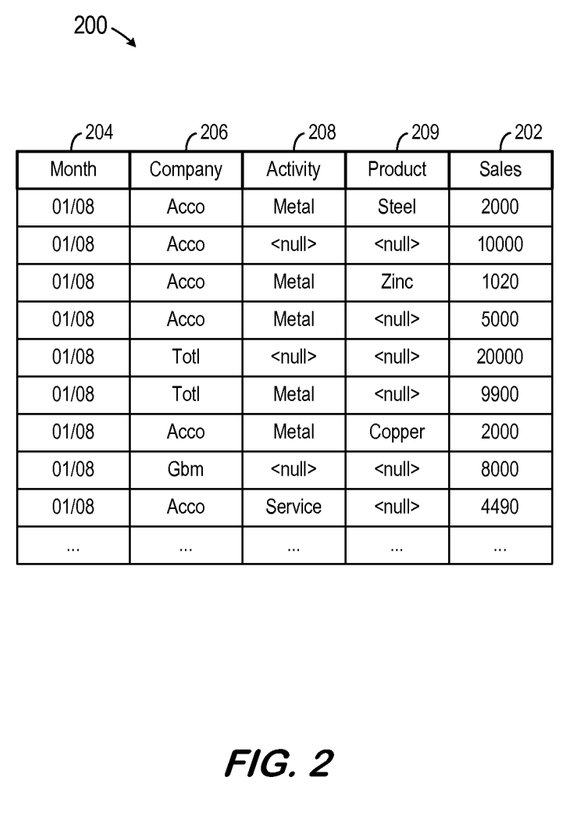
FIG. 2 illustrates a portion of a physical database table.

FIG. 2 illustrates database table 200 including the data of tables 110, 120 and 130. Database table 200 therefore shows sales data compiled at different levels of granularity. Database table 200 will be used to demonstrate that, if sales data is stored at different levels of granularity, the desired value of a Sales measure usually cannot be determined by aggregating the stored sales data at its most granular level.

More specifically, a case is considered in which a Sales measure of an abstraction layer is bound to column 202 of FIG. 2, and dimensions Month, Company, Activity and Product are bound to columns 204, 206, 208 and 209, respectively. The query {Dim: 1/08, Dim: Acco, Meas: Sales} will provide the result 24,510, which is the sum of column 202 for each row of table 200 which includes the month 1/08 and the company Acco. This result is virtually meaningless from a business standpoint.

Figure 3:
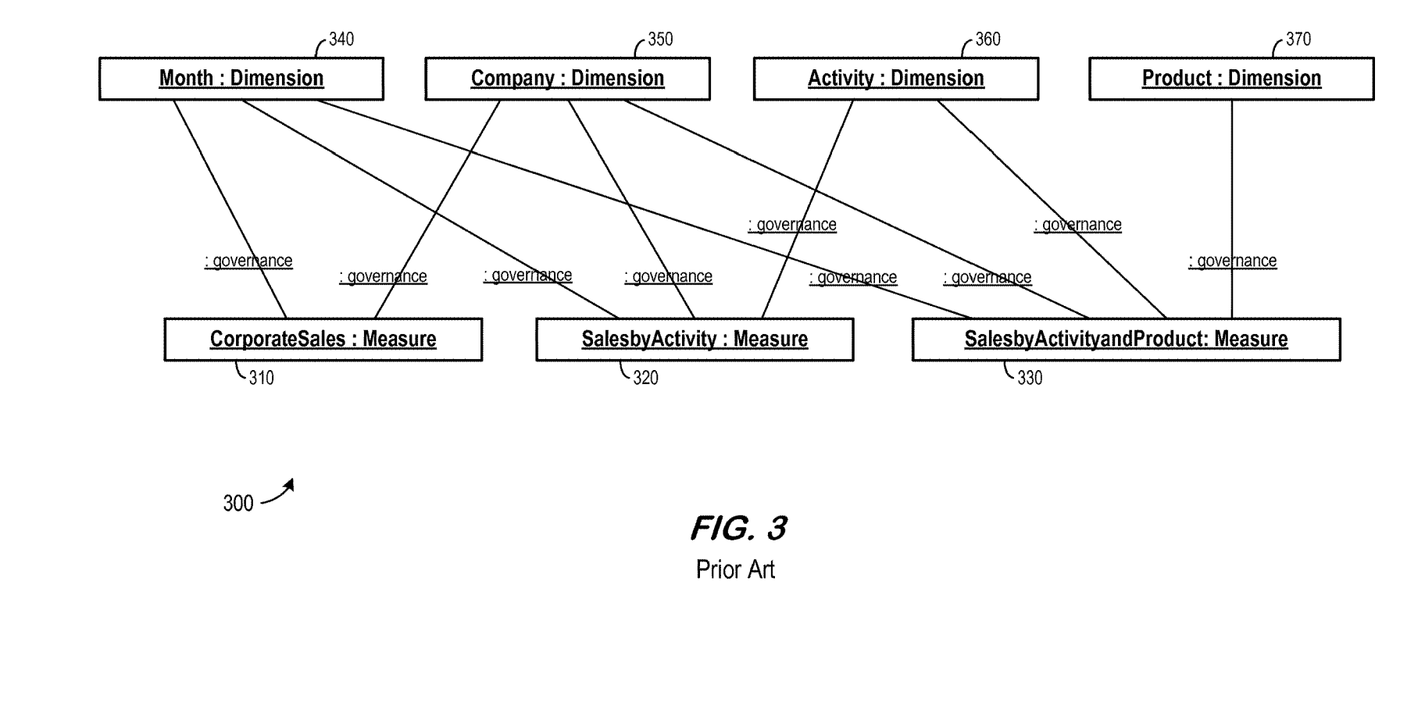
FIG. 3 is a representation of a prior art OLAP data model.

Conventional systems attempt to address the foregoing by creating a different measure for each level of granularity of a single measure (e.g., Sales). FIG. 3 illustrates data model 300 of a conventional Online Analytic Processing (OLAP) system including such different measures.

Data model 300 includes CorporateSales measure 310, SalesbyActivity measure 320, and SalesbyActivityandProduct measure 330. Each measure is independent from the others and individually declares the dimensions that govern it. CorporateSales measure 310 is governed only by Month dimension 340 and Company dimension 350, SalesbyActivity measure 320 is governed only by Month dimension 340, Company dimension 350 and Activity dimension 360, and SalesbyActivityandProduct measure 330 is governed only by Month dimension 340, Company dimension 350, Activity dimension 360 and Product dimension 370.

With reference to FIG. 1, CorporateSales measure 310 may be bound to column 112 of table 110, SalesbyActivity measure 320 may be bound to column 122 of table 120 and SalesbyActivityandProduct measure 330 may be bound to column 132 of table 130. The sales data collected at each level of granularity may therefore be accessed independently via the three measures CorporateSales, SalesbyActivity, and SalesbyActivityandProduct.

The measures of data model 300 are considered orthogonal to one another. In other words, data model 300 does not provide a data consumer with any indication of relationships between the measures which may actually exist in the underlying physical tables. Consequently, data model 300 does not provide any mechanism for semantically drilling down or drilling up among the multiple analysis levels represented by the measures. The multiple analysis levels may introduce data discrepancies due to simplification or errors. The existence and nature of the differences between the analysis levels would assist a data consumer in evaluating the reliability of data which is retrieved through each analysis level.

What is needed is an efficient system to represent a same measure which is tracked at different levels of detail and to facilitate navigation between the levels. Such a system may reduce a need to maintain multiple unrelated representations of a same measure, and may provide more meaningful evaluation of stored data and of the discrepancies reflected therein.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 4:
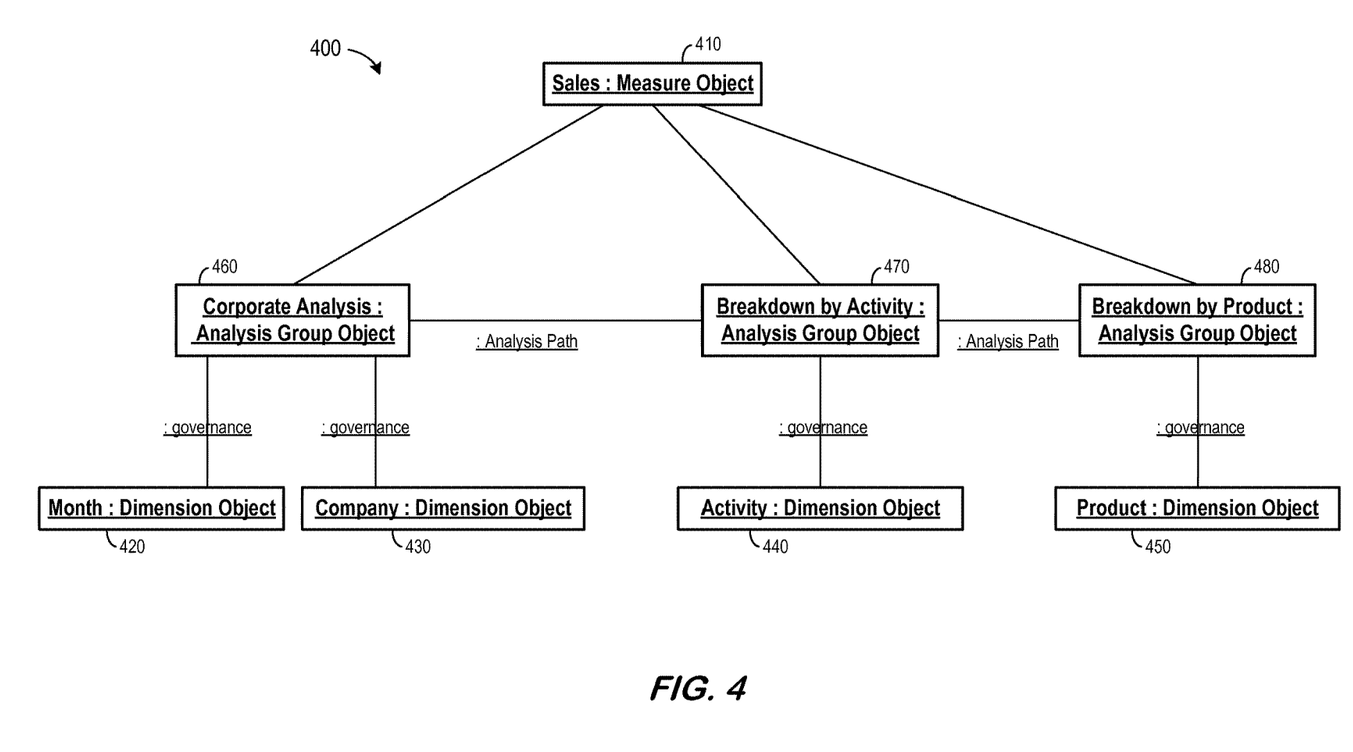
FIG. 4 is a UML instance diagram according to some embodiments.

FIG. 4 illustrates UML class diagram 400 of an abstraction layer based on the FIG. 2 data according to some embodiments. Diagram 400 includes Sales measure object 410 associated with a measure (i.e., sales) represented within stored data of a data source. Also included are Month dimension object 420, Company dimension object 430, Activity dimension object 440, and Product dimension object 450, each of which is associated with a respective dimension (i.e., month, company, activity, product) represented in the stored data.

Diagram 400 further includes Corporate Analysis analysis group object 460, Breakdown by Activity analysis group object 470, and Breakdown by Product analysis group object 480. Each analysis group object is linked to Sales measure object 410 and to a unique set of governing dimension objects. Diagram 400 therefore provides different levels of analysis for a single semantic measure rather than different semantic measures for each level of analysis as shown in FIG. 3.

Specifically, Corporate Analysis analysis group object 460 is linked to Month dimension object 420 and Company dimension object 430, while Breakdown by Activity analysis group object 470 is linked to Month dimension object 420, Company dimension object 430 and Activity dimension object 440. Lastly, Breakdown by Product analysis group object 480 is linked to Month dimension object 420, Company dimension object 430, Activity dimension object 440 and Product dimension object 450.

Since each analysis group object represents a different level of analysis, each analysis group object is associated with a different binding to the stored data of the associated data source. Taking FIG. 1 as an example, Corporate Analysis analysis group object 460 may be linked to table 110, which associates the measure (sales) with the dimensions of the dimension objects to which Corporate Analysis analysis group object 460 is linked (i.e., month and company). Breakdown by Activity analysis group object 470 may be linked to table 120, which associates the measure (sales) with the dimensions of the dimension objects to which Breakdown by Activity analysis group object 470 is linked (i.e., month, company and activity). Continuing with the example, Breakdown by Product analysis group object 480 may be linked to table 130, which associates the measure (sales) with the month, company, activity and product dimensions.

Similar bindings may be used in the case of table 200 of FIG. 2. Specifically, Corporate Analysis analysis group object 460 may be linked to those rows of table 200 in which only the values of Activity and Product are <null>, Corporate Analysis analysis group object 460 may be linked to those rows of table 200 in which only the value of Product is <null>, and Breakdown by Product analysis group object 480 may be linked to those rows of table 200 in which no column value is <null>. Other binding schemes may be employed to link analysis group objects to stored data of a corresponding analysis level.

Figure 5:
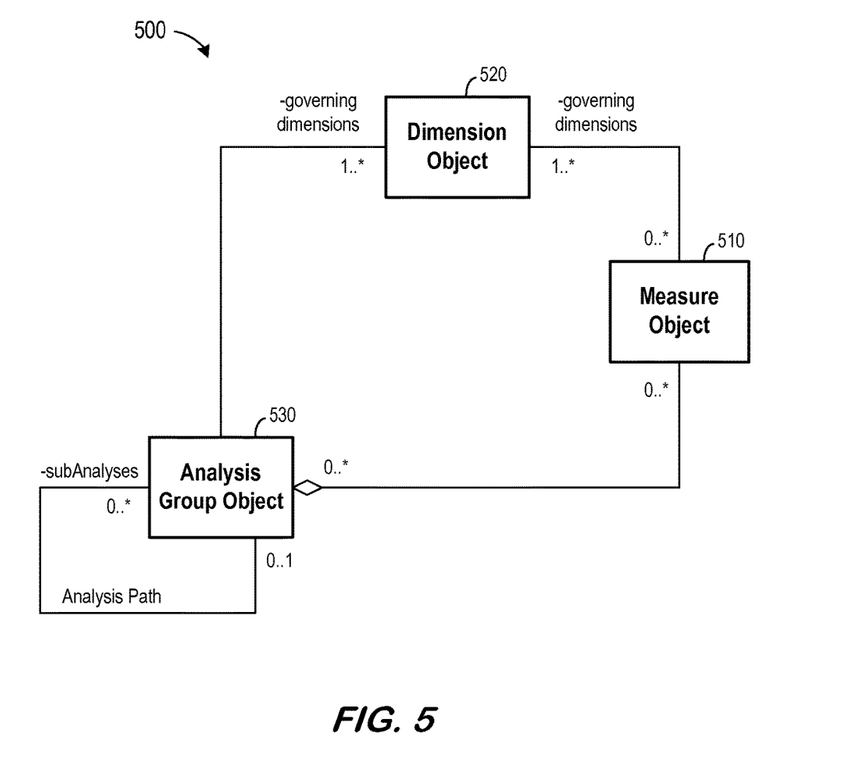
FIG. 5 is a UML class diagram according to some embodiments.

FIG. 5 is a UML class diagram according to some embodiments. Diagram 500 illustrates objects of which the FIG. 4 objects are instances.

As illustrated, and as described in aforementioned U.S. patent application Ser. No. 12/463,702, an instance of Measure object 510 knows the instances of Dimension object 520 which govern its values. A Dimension object is said to govern a Measure object if, within a query including the Measure object, the selection of some members of that Dimension object affects the measure value returned by the query.

Instances of Analysis Group object 530 aggregate instances of Measure object 510. Instances of Analysis Group object 530 therefore define the Dimension objects which govern instances of Measure object 510. An instance of Measure object 510 (e.g., Sales measure object 410) may belong to several instances of Analysis Group object 530 (e.g., Corporate Analysis analysis group object 460, Breakdown by Activity analysis group object 470, and Breakdown by Product analysis group object 480), and an instance of Analysis Group object 530 (e.g., Corporate Analysis analysis group object 460) may be linked to one or more other instances of Analysis Group object 530 (e.g., Breakdown by Activity analysis group object 470) which add one or more other governing Dimension objects (e.g., Activity dimension object 440).

Figure 6:
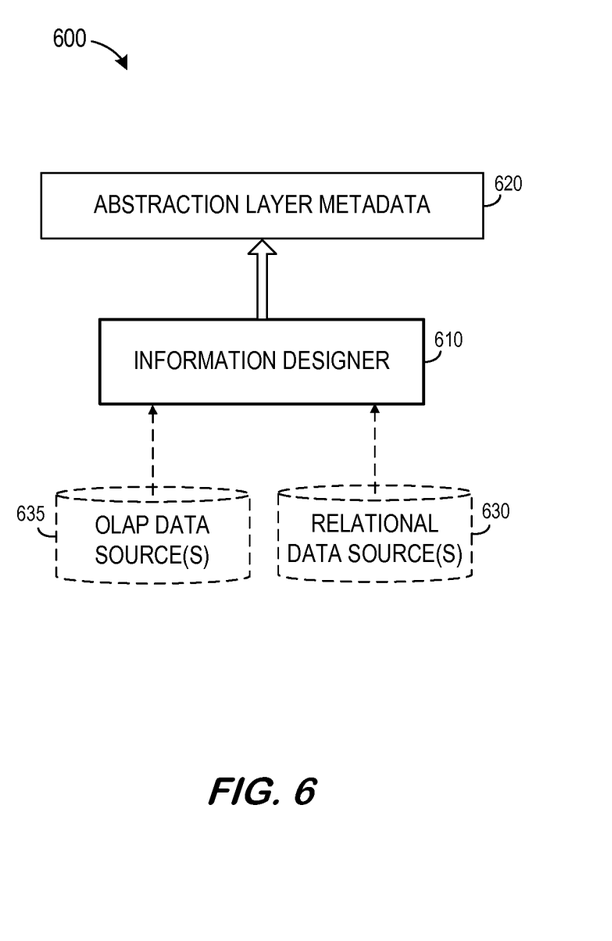
FIG. 6 is a block diagram of a system to generate an abstraction layer according to some embodiments.

System 600 of FIG. 6 comprises an architecture to define an abstraction layer according to some embodiments. Each element of FIG. 6 may be implemented by any suitable combination of hardware and/or software.

As illustrated, information designer 610 may create abstraction layer metadata 620 based on relational data source(s) 630 and OLAP data source(s) 635. Abstraction layer metadata 620 defines objects of an abstraction layer to represent data of data source(s) 630 and 635. The abstraction layer may comprise an abstraction layer as described herein including one or more analysis group objects.

Information designer 610 may comprise a standalone, Web-based or other application executing on any computing device or devices that are or become known. Data source(s) 630 and 635 may comprise any query-responsive data source or sources that are or become known, including but not limited to a structured-query language (SQL) relational database management system. Dashed lines are used in FIG. 6 to indicate that a connection between relational data source(s) 630 and 635 and information designer 610 need not exist before, during, or after generation of abstraction layer metadata 620. Such a connection, if established, may comprise any suitable database connection (e.g., Java Database Connector, QT/Connection Server).

Figure 7:
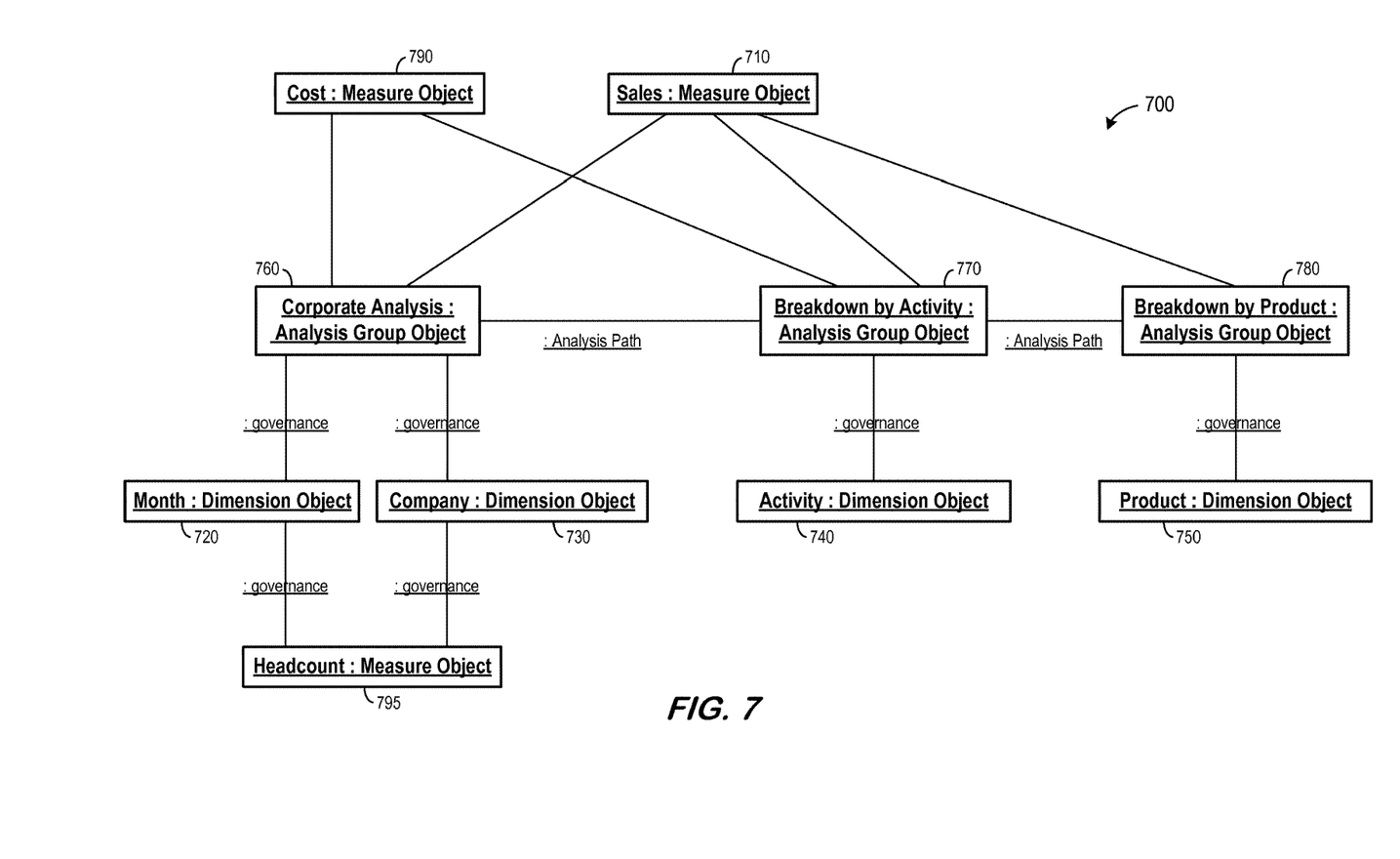
FIG. 7 is a UML instance diagram according to some embodiments.

FIG. 7 illustrates UML instance diagram 700 of an abstraction layer according to some embodiments. The abstraction layer includes analysis group objects which are linked to more than one measure object. Accordingly, these analysis group objects may be used to represent multiple analysis levels for each of the linked measure objects.

Objects 710 through 780 are linked as described above with respect to similarly-numbered objects of UML instance diagram 400. However, Corporate Analysis analysis group object 760 and Breakdown by Activity analysis group object 770 are also linked to Cost measure object 790. Accordingly, Corporate Analysis analysis group object 760 is linked to a portion of stored data which associates the cost measure with the month and company dimensions, and Breakdown by Activity analysis group object 770 is linked to a portion of stored data which associates the cost measure with the month, company and activity dimensions.

FIG. 7 also includes Headcount measure object 795 that is not linked to any analysis group object. Instead, Headcount measure object 795 is linked to Month dimension object 720 and Company dimension object 730. This arrangement may indicate that the headcount measure is presented at only one level of analysis (i.e., with respect to month and company dimensions) in the stored data associated with diagram 700.

As shown, Cost measure object 790 is not linked to Breakdown by Product analysis group object 780. Accordingly, unlike Sales measure object 710, Cost measure object 790 is not represented in the stored data at the level of analysis associated with Breakdown by Product analysis group object 780 (i.e., with respect to month, company, Activity and Product dimensions).

As described above, some embodiments facilitate the modeling of measure values acquired at different levels of analysis, or dimensional depths. Such modeling may be consumed so as to improve the navigation and understanding of such values. As described above, some embodiments can include a second analysis group object (e.g., analysis group object 760, 770) that can be linked to a second portion of the stored data associating the measure (e.g., measure object 790) with respective dimensions of the first one or more of the plurality of dimension objects (e.g., month, company, and activity) and with respective dimensions of the second one or more of the plurality of dimension objects. Additional analysis group objects (e.g., at least a third analysis group object) may be similarly linked.

Figure 8:
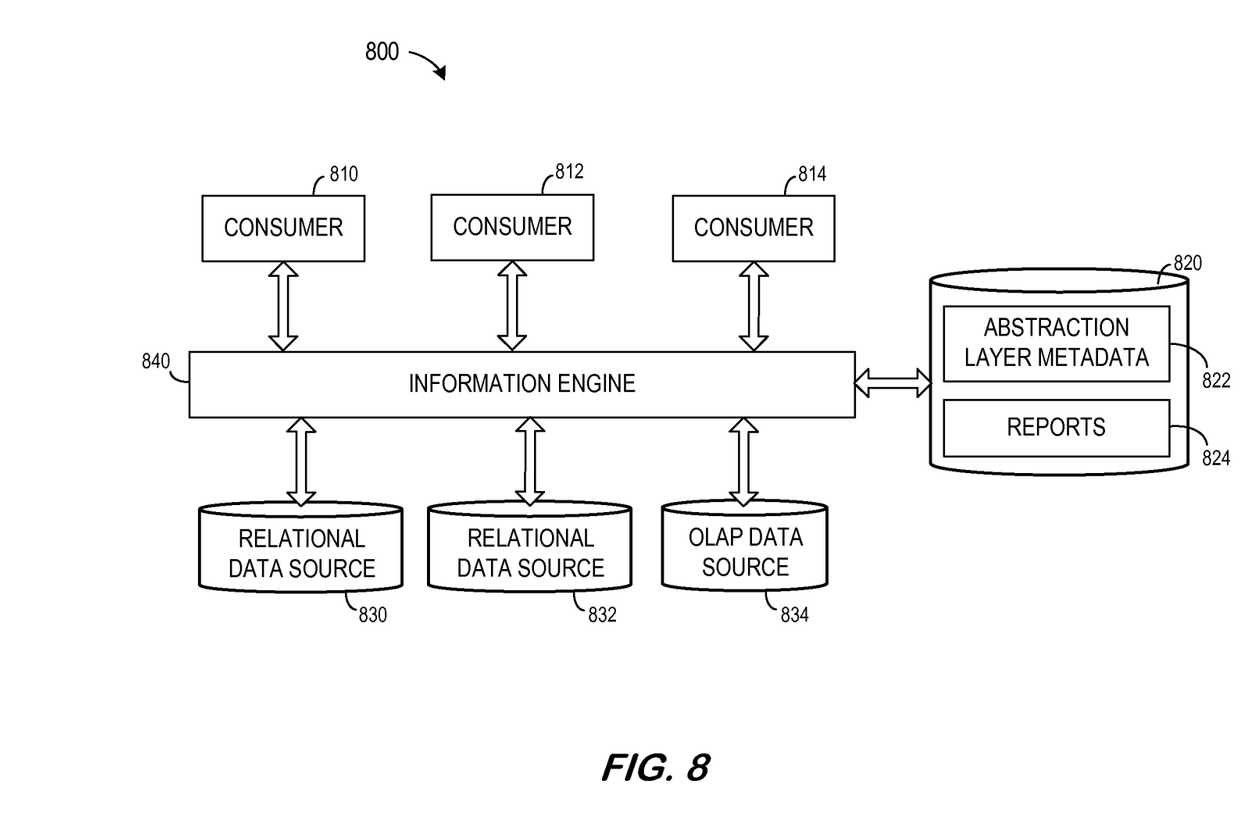
FIG. 8 is a block diagram of a system to consume data based on an abstraction layer according to some embodiments.

FIG. 8 illustrates runtime architecture 800 according to some embodiments. Generally, consumers 810 through 814 comprise software applications for object-based viewing of stored business data and/or creating object-based reports including stored business data. Examples of consumers 810 through 814 include BusinessObjects Web Intelligence, Crystal Reports, and BusinessObjects Explorer. Any number of reporting clients of one or more types may be supported according to some embodiments.

Central management system 820 includes abstraction layer metadata 822 corresponding to data stored among one or more relational data sources 830/832 and OLAP data source 834. Embodiments are not limited to the number and types of data sources shown in FIG. 8. Abstraction layer metadata 822 describes objects mapped to logical entities of relational data sources 830/832 and OLAP data source 834.

Information engine 840 presents data of data sources 830 through 834 to consumers 810 through 814. The presentation may be provided by a viewing/navigation component such as BusinessObjects Explorer or via a reporting engine. In some embodiments, information engine 840 may communicate with consumers 810 through 814 to allow a user to generate a query based on abstraction layer metadata 820. Information engine 840 may operate to query appropriate ones of data sources 830 through 834 based on the generated query and metadata 820, and may present results to consumers 810 through 814.

Figure 9:
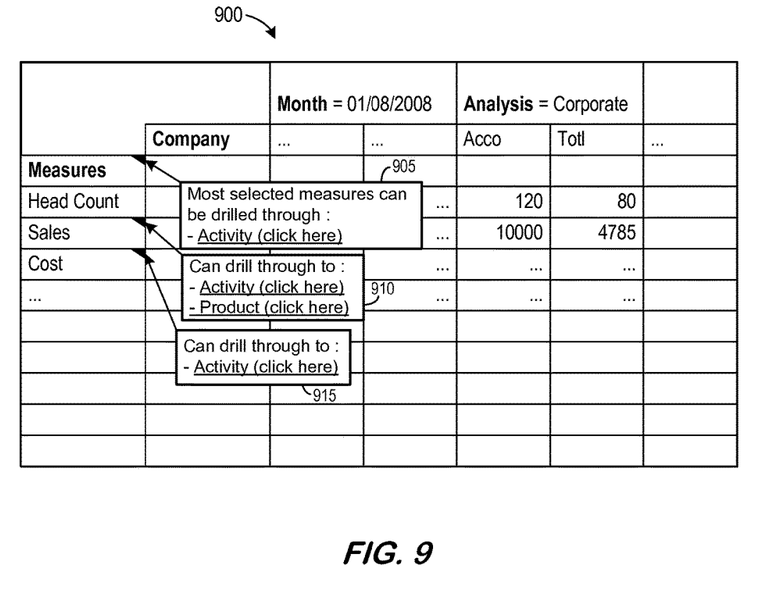
FIG. 9 is an outward view of a user interface presenting data retrieved based on an abstraction layer according to some embodiments.
Figure 10:
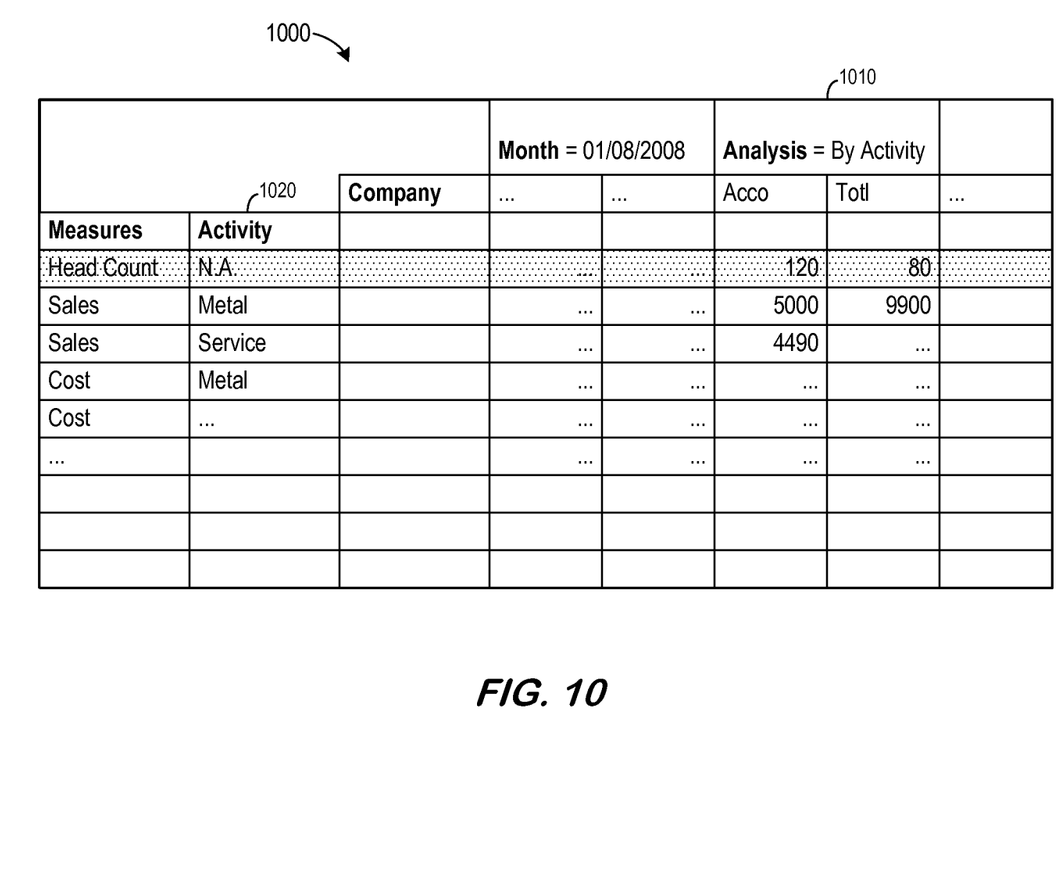
FIG. 10 is an outward view of a user interface presenting data retrieved based on an abstraction layer according to some embodiments.
Figure 11:
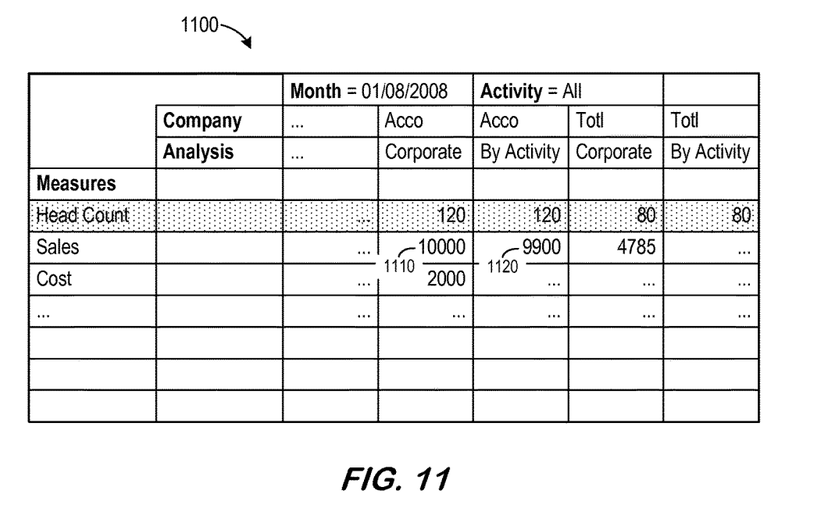
FIG. 11 is an outward view of a user interface presenting data retrieved based on an abstraction layer according to some embodiments.

For purposes of consumption, an analysis group object can be exposed as a dimension (e.g., to limit the concepts which must be understood by a user), or as an analysis group object per se. FIGS. 9 through 11 include outward views of user interfaces to present data via an abstraction layer according to some embodiments. The abstraction layer underlying FIGS. 9 through 11 may be similar to that represented by diagram 700 of FIG. 7.

Within these views, analysis group objects are presented as an additional dimension (i.e., "Analysis"). User interface 900 of FIG. 9 initially shows data associated with Corporate Analysis analysis group object 760. Moreover, the views may expose analysis paths between the analysis group objects to facilitate navigation there through. User interface 900, for example, includes tooltips 905 through 915. Tooltips 905 through 915 may assist a user in selecting a relevant breakdown for the set of measures being analyzed.

In particular, the link of tooltip 905 allows drilling to Cost and Sales data associated with Breakdown by Activity analysis group object 770, while the links of tooltip 910 provide drilling to Sales data associated with Breakdown by Activity analysis group object 770 and Breakdown by Product analysis group object 780. Since Cost measure object 790 is not linked to Breakdown by Product analysis group object 780, tooltip 915 only offers a link to Cost data associated with Breakdown by Activity analysis group object 770.

User interface 1000 of FIG. 10 may be presented if the user selects the link of tooltip 905. Analysis column 1010 now reads "By Activity" and the dimension object governed by Breakdown by Activity analysis group object 770 (i.e., Activity) is added in new column 1020. In some embodiments, measures not governed by the newly-displayed dimension, such as Headcount in the present example, may be displayed in a different manner than the other measures as shown.

FIG. 11 shows user interface 1100 for comparing data associated with different analysis levels according to some embodiments. For example, Sales data 1110 captured at the Corporate Analysis level (e.g., by the "Corporate" department) can be compared with Sales data 1120, which is the sum of Sales data recorded for each Activity at the Breakdown by Activity level. Such a presentation apprises the report consumer of the consistency of the different data sources.

Figure 12:
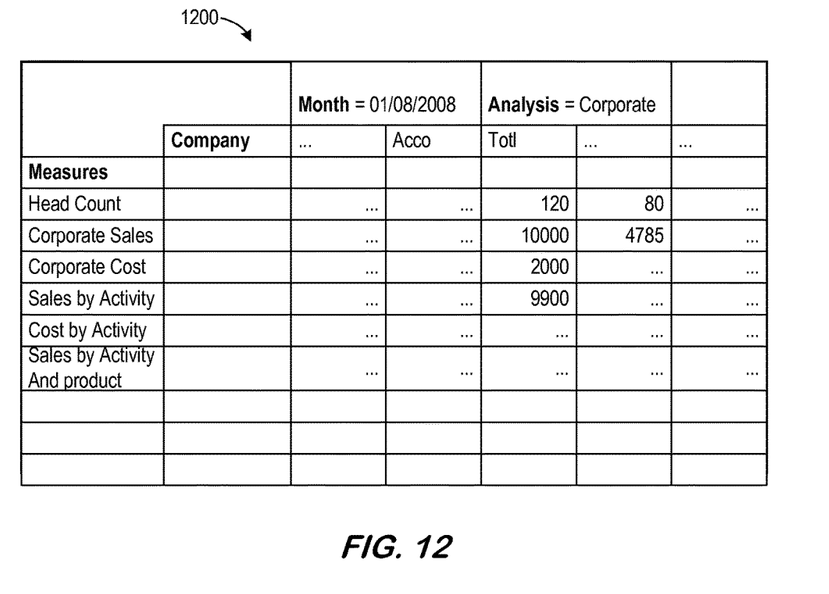
FIG. 12 is an outward view of a user interface presenting data retrieved based on a prior art OLAP data model.

FIG. 12 illustrates user interface 1200, which is a view of the data underlying view 1100, but as provided by a conventional OLAP system. As shown, interface 1200 does not provide semantic guidance into possible navigation paths through the data. Moreover, data comparison requires reading each individual cell and locating measures to be compared.

Some embodiments facilitate the creation and management of novel calculations. For example, a single formula (e.g., Revenue=Sales−Cost) may be created to calculate a new measure from existing measures. Advantageously, the single formula would be valid for all levels of analysis with respect to underlying data reflecting different analysis levels. A conventional system would, in contrast, require one formula for each measure (e.g., Corporate Revenue=Corporate Sales−Corporate Cost, By Activity Sales=By Activity Sales−By Activity Cost, . . . ).

Some embodiments also support usage of formulae to calculate the difference between different analysis levels (e.g, Corporate/By Product analyses delta=Corporate−By product). Such a formula could be presented as part of an analysis "dimension" as described above to be used by all measures linked to these two analysis groups objects. Again, conventional systems would require as many formulas as there are measures.

In accordance with an embodiment, a computer program code stored in a computer-readable medium may include code or executable instructions that when executed may instruct or cause a computer to perform methods discussed herein. The computer-readable medium may be a non-transitory computer-readable media including all forms and types of memory and all computer-readable media except for a transitory, propagating signal. In one implementation, the non-volatile memory or computer-readable medium may be external memory.

Embodiments described herein are solely for the purpose of illustration. Those in the art will recognize other embodiments may be practiced with modifications and alterations to that described above.

What is claimed is:

1. An electronic data structure stored on a data source, the electronic data structure comprising:
an abstraction layer created by an application executing on a computing device, the abstraction layer associated with stored data and comprising:
a plurality of measure objects each associated with a respective single semantic measure;
a plurality of unique sets of governing dimension objects, each respective unique set of governing objects associated with one or more respective dimensions;
a first analysis group object linked to a first set of measure objects of the plurality of measure objects, to a first unique set of governing dimension objects, and to a first portion of the stored data associating the respective single semantic measure, that is associated with one of the plurality of measure objects, with the one or more respective dimensions of the first unique set of governing dimension objects;
a second analysis group object linked to a second set of measure objects of the plurality of measure objects, to a second unique set of governing dimension objects, and to a second portion of the stored data associating the respective single semantic measure, that is associated with one of the plurality of measure objects, with the one or more respective dimensions of the first unique set of governing dimension objects and with one or more respective dimensions of the second unique set of governing dimension objects;
the first set of measure objects associated with a first measure represented in the first portion of stored data, and the second set of measure objects associated with a second measure represented in the second portion of stored data, the first measure and the second measure having at least one difference; and
the abstraction layer providing different granularity of analysis levels for the single semantic measure;
wherein each analysis group represents multiple granularity levels of analysis based on the first analysis group and the second analysis group, and each analysis group is associated with a different binding to the stored data.

2. The electronic data structure according to claim 1, the abstraction layer further comprising:
a third analysis group object linked to the measure object, to a third unique set of governing dimension objects, and to a third portion of the stored data associating the single semantic measure with the one or more respective dimensions of (1) the first unique set of governing dimension objects, (2) the second unique set of governing dimension objects, and (3) the third unique set of governing dimension objects.

3. The electronic data structure according to claim 1, the abstraction layer further comprising:
a second measure object associated with a second single semantic measure,
wherein the first analysis group object is linked to the second measure object, and
wherein the first portion of the stored data associates the second single semantic measure with the one or more respective dimensions of the first unique set of governing dimension objects.

4. The electronic data structure according to claim 3, wherein the second analysis group object is linked to the second measure object, and
wherein the second portion of the stored data associates the second single semantic measure with the one or more respective dimensions of the first unique set of governing dimension objects and with the one or more respective dimensions of the second unique set of governing dimension objects.

5. The electronic data structure according to claim 4, the abstraction layer further comprising:
a third analysis group object linked to the measure object, to a third unique set of governing dimension objects, and to a third portion of the stored data associating the single semantic measure with the one or more respective dimensions of (1) the first unique set of governing dimension objects, (2) the second unique set of governing dimension objects, and (3) the third unique set of governing dimension objects.

6. The electronic data structure according to claim 4, the abstraction layer further comprising:
a third measure object associated with a third single semantic measure, linked to the first unique set of governing dimension objects and linked to at least the first portion and to the second portion of the stored data.

7. The electronic data structure according to claim 1, the abstraction layer further comprising:
a second measure object associated with a second single semantic measure, linked to the first unique set of governing dimension objects and linked to at least the first portion and to the second portion of the stored data.

8. A non-transitory computer-readable medium having stored thereon program code, the program code executable by a computer to provide:
an abstraction layer associated with stored data and comprising:
a plurality of measure objects each associated with a respective single semantic measure;

a plurality of unique sets of governing dimension objects, each respective unique set of governing objects associated with one or more respective dimensions;

a first analysis group object linked to a first set of measure objects of the plurality of measure objects, to a first unique set of governing dimension objects, and to a first portion of the stored data associating the respective single semantic measure, that is associated with one of the plurality of measure objects, with the one or more respective dimensions of the first unique set of governing dimension objects;

a second analysis group object linked to a second set of measure objects of the plurality of measure objects, to a second unique set of governing dimension objects, and to a second portion of the stored data associating the respective single semantic measure, that is associated with one of the plurality of measure objects, with the one or more respective dimensions of the first unique set of governing dimension objects and with one or more respective dimensions of the second unique set of governing dimension objects;

the first set of measure objects associated with a first measure represented in the first portion of stored data, and the second set of measure objects associated with a second measure represented in the second portion of stored data, the first measure and the second measure having at least one difference; and the abstraction layer providing different granularity of analysis levels for the single semantic measure;

wherein each analysis group represents multiple granularity levels of analysis based on the first analysis group and the second analysis group, and each analysis group is associated with a different binding to the stored data.

9. The non-transitory computer-readable medium according to claim 8, the abstraction layer further comprising:

a third analysis group object linked to the measure object, to a third unique set of governing dimension objects, and to a third portion of the stored data associating the single semantic measure with the one or more respective dimensions of the first unique set of governing dimension objects, the second unique set of governing dimension objects, and the third unique set of governing dimension objects.

10. The non-transitory computer-readable medium according to claim 8, the abstraction layer further comprising:

a second measure object associated with a second single semantic measure, wherein the first analysis group object is linked to the second measure object, and wherein the first portion of the stored data associates the second single semantic measure with the one or more respective dimensions of the first unique set of governing dimension objects.

11. The non-transitory computer-readable medium according to claim 10, wherein the second analysis group object is linked to the second measure object, and wherein the second portion of the stored data associates the second single semantic measure with the one or more respective dimensions of the first unique set of governing dimension objects and with one or more respective dimensions of the second unique set of governing dimension objects.

12. The non-transitory computer-readable medium according to claim 11, the abstraction layer further comprising:

a third analysis group object linked to the measure object, to a third unique set of governing dimension objects, and to a third portion of the stored data associating the single semantic measure with the one or more respective dimensions of the first unique set of governing dimension objects, the second unique set of governing dimension objects, and the third unique set of governing dimension objects.

13. The non-transitory computer-readable medium according to claim 11, the abstraction layer further comprising:

a third measure object associated with a third single semantic measure, linked to the first unique set of governing dimension objects and linked to at least the first portion and to the second portion of the stored data.

14. The non-transitory computer-readable medium according to claim 8, the abstraction layer further comprising:

a second measure object associated with a second single semantic measure, linked to the first unique set of governing dimension objects and linked to at least the first portion and to the second portion of the stored data.

15. A system comprising:

a computer device implementing one or more data sources, each of the one or more data sources having a database of physical data tables including stored data; and an abstraction layer associated with the stored data and comprising:

a plurality of measure objects each associated with a respective single semantic measure;

a plurality of unique sets of governing dimension objects, each respective unique set of governing objects associated with respective dimensions;

a first analysis group object linked to a first set of measure objects of the plurality of measure objects, to a first unique set of governing dimension objects, and to a first portion of the stored data associating the respective single semantic measure, that is associated with one of the plurality of measure objects, with the one or more respective dimensions of the first unique set of governing dimension objects;

a second analysis group object linked to a second set of measure objects of the plurality of measure objects, to a second unique set of governing dimension objects, and to a second portion of the stored data associating the respective single semantic measure, that is associated with one of the plurality of measure objects, with the one or more respective dimensions of the first unique set of governing dimension objects and with one or more respective dimensions of the second unique set of governing dimension objects;

the first set of measure objects associated with a first measure represented in the first portion of stored data, and the second set of measure objects associated with a second measure represented in the second portion of stored data, the first measure and the second measure having at least one difference;

the abstraction layer providing different granularity of analysis levels for the single semantic measure;

wherein each analysis group represents multiple granularity levels of analysis based on the first analysis group and the second analysis group, and each analysis group is associated with a different binding to the stored data; and an information engine including at least one of a viewing agent component and a reporting engine, the information engine configured to present the stored data to a user and to query the one or more data sources based on a query communicated by a user.

16. The system according to claim 15, the abstraction layer further comprising:

a third analysis group object linked to the measure object, to a third unique set of governing dimension objects, and to a third portion of the stored data associating the single semantic measure with the one or more respective dimensions of (1) the first unique set of governing dimension objects, (2) the second unique set of governing dimension objects, and (3) the third unique set of governing dimension objects.

17. The system according to claim 15, the abstraction layer further comprising:

a second measure object associated with a second single semantic measure, wherein the first analysis group object is linked to the second measure object, and wherein the first portion of the stored data associates the second single semantic measure with the one or more respective dimensions of the first unique set of governing dimension objects.

18. The system according to claim 17, wherein the second analysis group object is linked to the second measure object, and wherein the second portion of the stored data associates the second single semantic measure with the one or more respective dimensions of the first unique set of governing dimension objects and with the one or more respective dimensions of the second unique set of governing dimension objects.

19. The system according to claim 18, the abstraction layer further comprising:

a third analysis group object linked to the measure object, to a third unique set of governing dimension objects, and to a third portion of the stored data associating the single semantic measure with the one or more respective dimensions of (1) the first unique set of governing dimension objects, (2) the second unique set of governing dimension objects, and (3) the third unique set of governing dimension objects.

20. The system according to claim 18, the abstraction layer further comprising:

a third measure object associated with a third single semantic measure, linked to the first unique set of governing dimension objects and linked to at least the first portion and to the second portion of the stored data.

* * * * *